United States Patent
Lee et al.

(10) Patent No.: US 12,127,047 B2
(45) Date of Patent: Oct. 22, 2024

(54) ACCESS STRATUM (AS) SECURITY FOR A CENTRALIZED RADIO ACCESS NETWORK (C-RAN)

(71) Applicant: QUALCOMM Incorporated, San Diego, CA (US)

(72) Inventors: Soo Bum Lee, San Diego, CA (US); Gavin Bernard Horn, La Jolla, CA (US)

(*) Notice: Subject to any disclaimer, the term of this patent is extended or adjusted under 35 U.S.C. 154(b) by 0 days.

(21) Appl. No.: 16/380,104

(22) Filed: Apr. 10, 2019

(65) Prior Publication Data

US 2019/0320352 A1    Oct. 17, 2019

Related U.S. Application Data

(60) Provisional application No. 62/656,829, filed on Apr. 12, 2018.

(51) Int. Cl.
*H04W 36/00* (2009.01)
*H04W 12/041* (2021.01)
(Continued)

(52) U.S. Cl.
CPC ..... *H04W 36/0038* (2013.01); *H04W 12/041* (2021.01); *H04W 12/0471* (2021.01); *H04W 76/27* (2018.02)

(58) Field of Classification Search
CPC ........... H04W 12/04; H04W 12/04031; H04W 36/38; H04W 36/0055; H04W 12/041;
(Continued)

(56) References Cited

U.S. PATENT DOCUMENTS 11,375,527 B1\* 6/2022 Eyuboglu .......... H04B 7/15528
2012/0163336 A1 6/2012 Adjakple et al.
(Continued)

FOREIGN PATENT DOCUMENTS

CN 107371155 A 11/2017
WO 2019076243 A1 4/2019

OTHER PUBLICATIONS

"3rd Generation Partnership Project; Technical Specification Group Services and System Aspects; Security architecture and procedures for 5G system (Release 15)", 3GPP Standard; Technical Specification; 3GPP TS 33.501, 3rd Generation Partnership Project (3GPP), Mobile Competence Centre ; 650, Route Des Lucioles ; F-06921 Sophia-Antipolis Cedex ; France, vol. SA WG3. No. V15.0.0, Mar. 26, 2018 (Mar. 26, 2018), pp. 1-128, XP051450501, [retrieved on Mar. 26, 2018], p. 61, line 1-p. 65, last line, p. 105, line 1-p. 110, last line.

(Continued)

*Primary Examiner* — Michael Thier
*Assistant Examiner* — Prince A Mensah

(57) ABSTRACT

Techniques for secure control plane communications between a User Equipment (UE) and a gNB are provided. A RAN network entity decides to handover a UE from a source base station (BS) to a target BS, wherein the RAN network entity controls a plurality of BSs including at least one of the source BS or the target BS, and wherein at least a portion of a control plane (CP) protocol layer is implemented at the target BS. The network entity generates at least one key specific to the target BS, based on a master key and a freshness parameter, the master key associated with the network entity. The network entity transmits an indication of the at least one key to the target BS, wherein the target BS exchanges control signaling with the UE based on the CP protocol layer using the at least one key.

30 Claims, 13 Drawing Sheets

(51) Int. Cl.
*H04W 12/0471* (2021.01)
*H04W 76/27* (2018.01)

(58) Field of Classification Search
CPC ......... H04W 12/0471; H04W 36/0038; H04W 76/27
See application file for complete search history.

(56) References Cited

U.S. PATENT DOCUMENTS

| | | | |
|---|---|---|---|
| 2015/0181473 A1* | 6/2015 | Horn | H04W 36/0027 |
| | | | 370/329 |
| 2016/0205547 A1* | 7/2016 | Rajadurai | H04W 12/06 |
| | | | 726/4 |
| 2016/0337914 A1* | 11/2016 | Hoffmann | H04W 36/08 |
| 2017/0195935 A1* | 7/2017 | Xu | H04W 36/18 |
| 2017/0289797 A1* | 10/2017 | Bae | H04L 9/0869 |
| 2018/0084414 A1 | 3/2018 | Lee et al. | |
| 2018/0084464 A1 | 3/2018 | Ozturk et al. | |
| 2018/0084475 A1* | 3/2018 | Norrman | H04W 12/033 |
| 2018/0091485 A1 | 3/2018 | Lee et al. | |
| 2018/0376332 A1* | 12/2018 | Basu Mallick | H04W 12/04 |
| 2019/0082367 A1* | 3/2019 | Lin | H04W 36/38 |
| 2019/0159025 A1* | 5/2019 | Ben Henda | H04W 12/0401 |
| 2020/0008054 A1* | 1/2020 | Wifvesson | H04W 36/0055 |
| 2020/0120735 A1* | 4/2020 | Wang | H04L 5/0098 |

OTHER PUBLICATIONS

International Search Report and Written Opinion—PCT/US2019/027024—ISA/EPO—Jun. 26, 2019.

\* cited by examiner

ACCESS STRATUM (AS) SECURITY FOR A CENTRALIZED RADIO ACCESS NETWORK (C-RAN)

CROSS-REFERENCE TO RELATED APPLICATION(S)

This application claims priority to U.S. Provisional Application No. 62/656,829, entitled "ACCESS STRATUM (AS) SECURITY FOR $5^{TH}$ GENERATION (5G) CENTRALIZED RADIO ACCESS NETWORK (C-RAN)", filed on Apr. 12, 2018, which is expressly incorporated by reference in its entirety.

BACKGROUND

Field of the Disclosure

Aspects of the present disclosure relate to wireless communications, and more particularly, to techniques for secure control plane communications between a User Equipment (UE) and a base station (BS) in a Centralized Radio Access Network (C-RAN).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a Radio Access Network (RAN) entity. The method generally includes deciding to handover a UE from a source base station (BS) to a target BS, wherein the RAN network entity controls a plurality of BSs including at least one of the source BS or the target BS, and wherein at least a portion of a control plane (CP) protocol layer is implemented at the target BS; generating at least one key specific to the target BS, based on a master key and a freshness parameter, the master key associated with the network entity; and transmitting an indication of the at least one key to the target BS, wherein the target BS exchanges control signaling with the UE based on the CP protocol layer using the at least one key.

Certain aspects of the present disclosure provide a method for wireless communication by a User Equipment (UE). The method generally includes receiving a command to handover the UE from a source base station (BS) to a target BS, the command including at least an indication to generate at least one key specific to the target BS and a freshness parameter for generating the at least one key, wherein at least a portion of a control plane (CP) protocol layer is implemented at the target BS; generating the at least one key based at least on the freshness parameter and a master key, the master key associated with a Radio Access Network (RAN) network entity controlling at least the source BS; and exchanging control signaling with the target BS based on the CP protocol layer using the at least one key.

Certain aspects of the present disclosure provide a UE. The UE generally includes at least one processor and a memory coupled to the at least one processor. The at least one processor is generally configured to receive a command to handover the UE from a source base station (BS) to a target BS, the command including at least an indication to generate at least one key specific to the target BS and a freshness parameter for generating the at least one key, wherein at least a portion of a control plane (CP) protocol layer is implemented at the target BS; generate the at least one key based at least on the freshness parameter and a master key, the master key associated with a Radio Access Network (RAN) network entity controlling at least the source BS; and exchange control signaling with the target BS based on the CP protocol layer using the at least one key.

Certain aspects of the present disclosure provide a RAN entity. The RAN entity generally includes at least one processor and a memory coupled to the at least one processor. The at least one processor is generally configured to decide to handover a UE from a source base station (BS) to a target BS, wherein the RAN network entity controls a plurality of BSs including at least one of the source BS or the target BS, and wherein at least a portion of a control plane (CP) protocol layer is implemented at the target BS; generate at least one key specific to the target BS, based on a master key and a freshness parameter, the master key associated with the network entity; and transmit an indication of the at least one key to the target BS, wherein the target BS exchanges control signaling with the UE based on the CP protocol layer, wherein the control signaling is protected based on the at least one key.

Certain aspects provide a RAN entity. The RAN entity generally includes means for deciding to handover a UE from a source base station (BS) to a target BS, wherein the RAN network entity controls a plurality of BSs including at least one of the source BS or the target BS, and wherein at least a portion of a control plane (CP) protocol layer is implemented at the target BS; means for generating at least one key specific to the target BS, based on a master key and a freshness parameter, the master key associated with the network entity; and means for transmitting an indication of the at least one key to the target BS, wherein the target BS exchanges control signaling with the UE based on the CP protocol layer using the at least one key.

Certain aspects of the present disclosure provide a UE. The UE generally includes means for receiving a command to handover the UE from a source base station (BS) to a target BS, the command including at least an indication to generate at least one key specific to the target BS and a freshness parameter for generating the at least one key, wherein at least a portion of a control plane (CP) protocol layer is implemented at the target BS; means for generating the at least one key based at least on the freshness parameter and a master key, the master key associated with a Radio Access Network (RAN) network entity controlling at least the source BS; and means for exchanging control signaling with the target BS based on the CP protocol layer using the at least one key.

Certain aspects provide a computer-readable medium for wireless communication by a RAN entity. The computer-readable medium generally stores instructions which when executed by at least one processor performs a method including deciding to handover a UE from a source base station (BS) to a target BS, wherein the RAN network entity controls a plurality of BSs including at least one of the source BS or the target BS, and wherein at least a portion of a control plane (CP) protocol layer is implemented at the target BS; generating at least one key specific to the target BS, based on a master key and a freshness parameter, the master key associated with the network entity; and transmitting an indication of the at least one key to the target BS, wherein the target BS exchanges control signaling with the UE based on the CP protocol layer using the at least one key.

Certain aspects of the present disclosure provide a computer-readable medium for wireless communication by a UE. The computer-readable medium generally stores instructions which when executed by at least one processor performs a method including receiving a command to handover the UE from a source base station (BS) to a target BS, the command including at least an indication to generate at least one key specific to the target BS and a freshness parameter for generating the at least one key, wherein at least a portion of a control plane (CP) protocol layer is implemented at the target BS; generating the at least one key based at least on the freshness parameter and a master key, the master key associated with a Radio Access Network (RAN) network entity controlling at least the source BS; and exchanging control signaling with the target BS based on the CP protocol layer using the at least one key.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
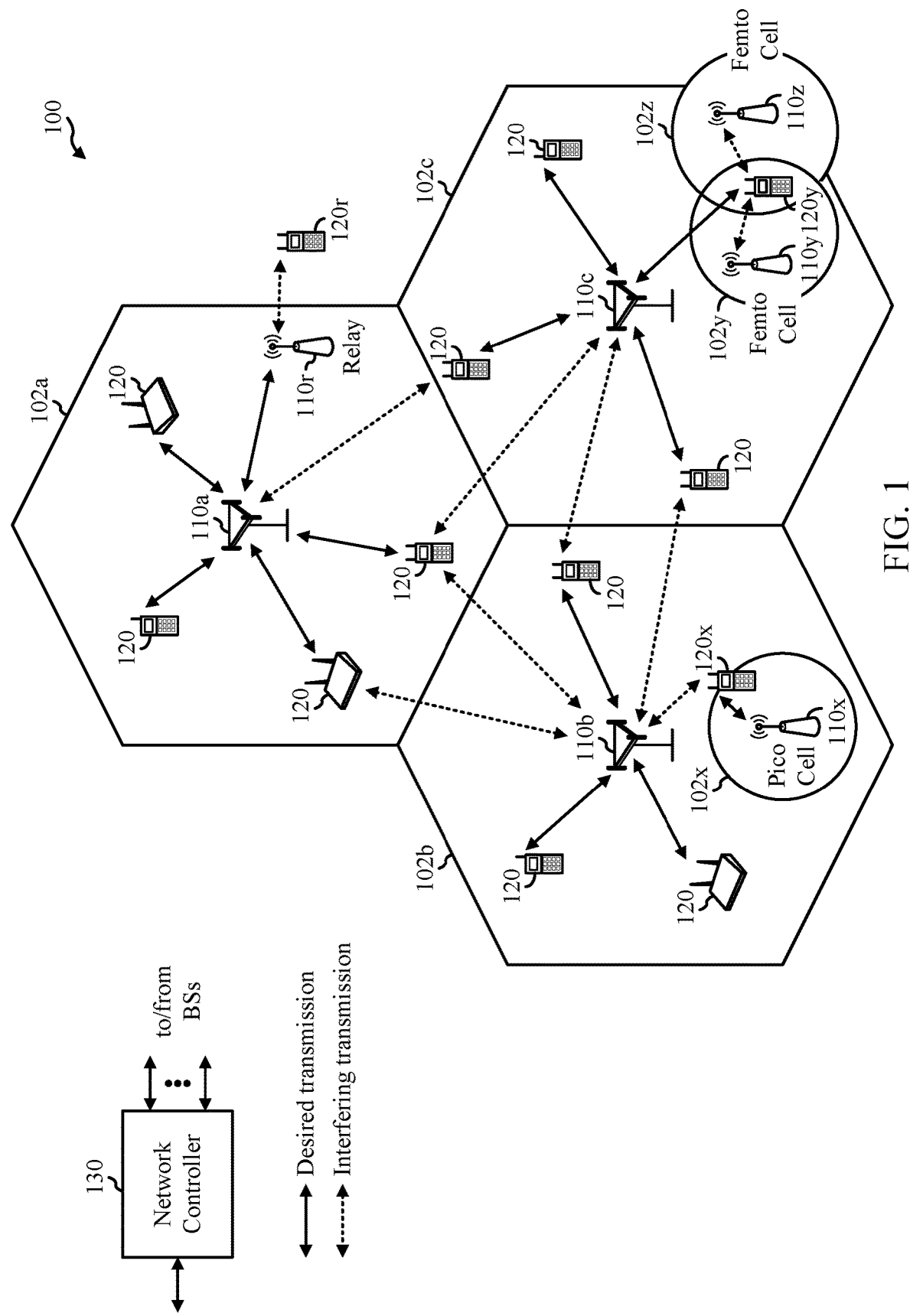
FIG. 1 is a block diagram conceptually illustrating an example telecommunications system, in accordance with certain aspects of the present disclosure.

In certain aspects, in a centralized RAN architecture (e.g., cloud based RAN architecture), the Central Unit (CU) of a gNB may be provided as a cloud service and the CU may be located in cloud servers. In this kind of architecture, the Distributed Unit (DU), deployed as an edge node, is responsible for over the air (OTA) data communication with a UE. The CU handles both the control plane (CP) and user plane (UP) traffic for the DU and provides packets to the DU for transmission to the UE and receives packets received and forwarded by the DU. In this case, most of the actual processing of the user plane and data packets (e.g., relating to the PDCP and RRC layers) takes place at the CU located in the cloud.

In certain aspects, a problem with the above discussed cloud based architecture where both the control plane and the user plane reside in the cloud while DU's are deployed at the edge (i.e., close to UEs) is that RRC signaling latency may be increased over a long F1-C link between the CU and the DU, which might not be acceptable for certain types of services and/or applications. For example, a UE receives RRC signaling from a serving base station (e.g., DU) scheduling resources for downlink and uplink transmissions. However, if the CU is located in the cloud, the RRC signaling may experience an increased latency due to the long F1-C link between the CU and the DU. This long RRC signaling latency may not be acceptable for certain latency critical services and/or applications. Further, RRC transport over the F1-C may not be desired due to potential attacks, as the F1-C interface may be exploited by attackers and cause RRC signaling congestion.

Certain aspects of the present disclosure discuss techniques for secure low latency control plane communications between a UE and a gNB. In certain aspects, the control plane may be moved toward the RAN edge (e.g., closer to the UE) while keeping the user plane in the cloud. In an aspect, this is accomplished by implementing at least a portion of the CP (e.g., a CP portion responsible for RRC signaling and CP security) in the DU. In certain aspects, moving the CP closer to the UE improves RRC signaling latency and improves CP signaling security by making the CP signaling less vulnerable to attacks.

In certain aspects, when implementing the CP or a portion thereof in the DU, an additional level of CP protection may be implemented to protect RRC messages, by changing the CP keys when the DU changes (e.g., UE handover between DUs). Using different CP keys for different DUs provides security separation between DUs on the CP. This ensures that even if one DU-UE link is compromised, other DU-UE links are still secure. In an aspect, the UP keys may not change upon a DU change as the UP security termination point resides in the cloud.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

Figure 2:
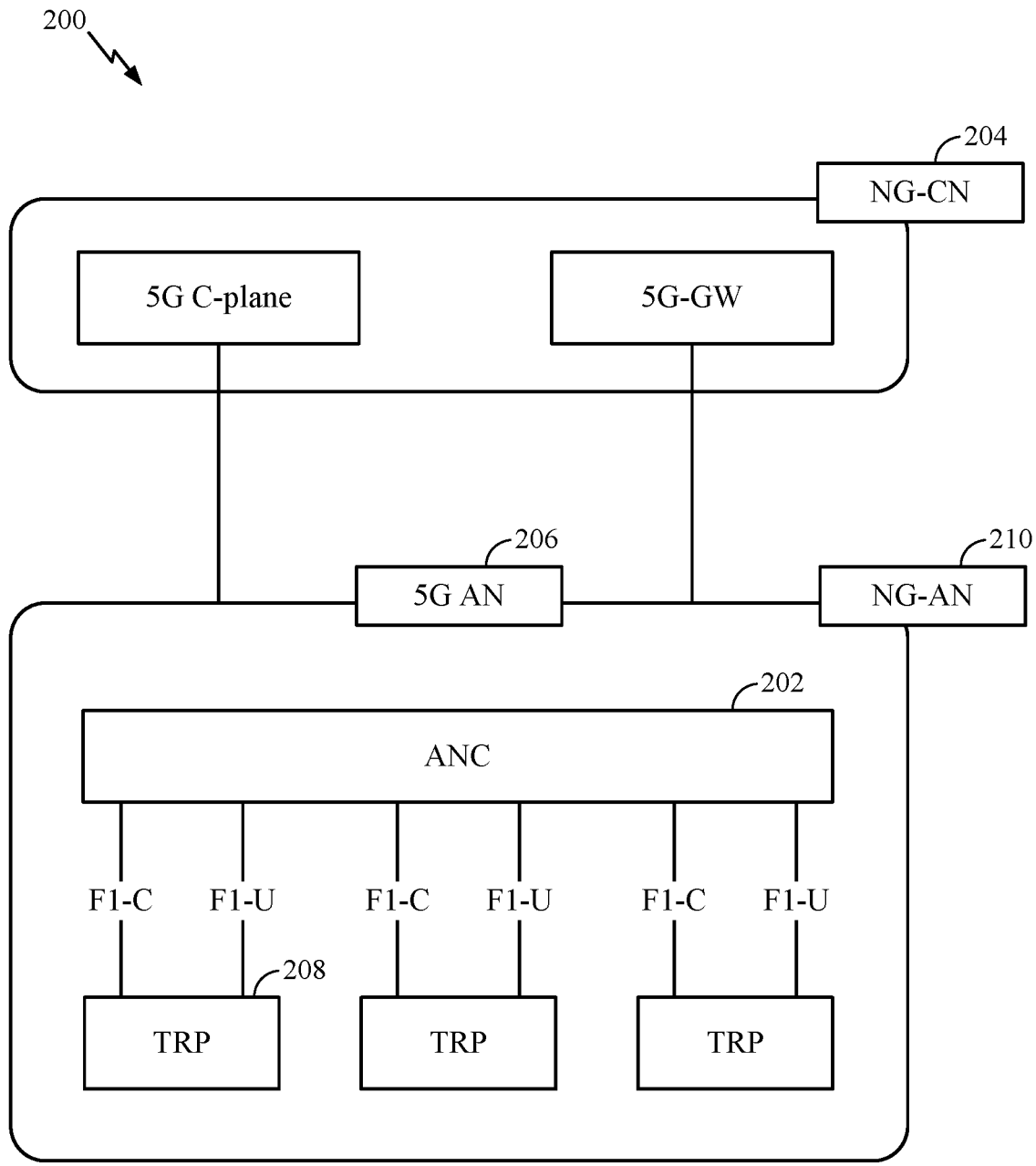
FIG. 2 is a block diagram illustrating an example logical architecture of a distributed radio access network (RAN), in accordance with certain aspects of the present disclosure.

FIG. 1 illustrates an example wireless communication network 100 in which aspects of the present disclosure may be performed. For example, the wireless communication network 100 may be a New Radio (NR) or 5G network. In an aspect, as shown in FIG. 1, each of the User Equipments (UEs) 120 may be configured to perform secure control plane communication with a network entity (e.g., Access Node Controller as shown in FIG. 2) via a base stations (BS) 110 according to aspects described herein. In an aspect, as shown in FIG. 1 each of the BSs 110 may be configured to perform at least a portion of operations related to the secure control plane communication between one or more UEs 120 and the network entity according to aspects described herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink.

A finely dashed line with double arrows indicates interfering transmissions between a UE and a BS.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.). In certain aspects, the ANC 202 may be configured to perform secure control plane communication with one or more UEs via one of the TRPs 208 according to aspects described herein. Further, each of the TRPs 208 may perform at least a portion of the operations related to the secure control plane communications between the ANC 202 and one or more UEs served by the TRP according to the aspects described herein.

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
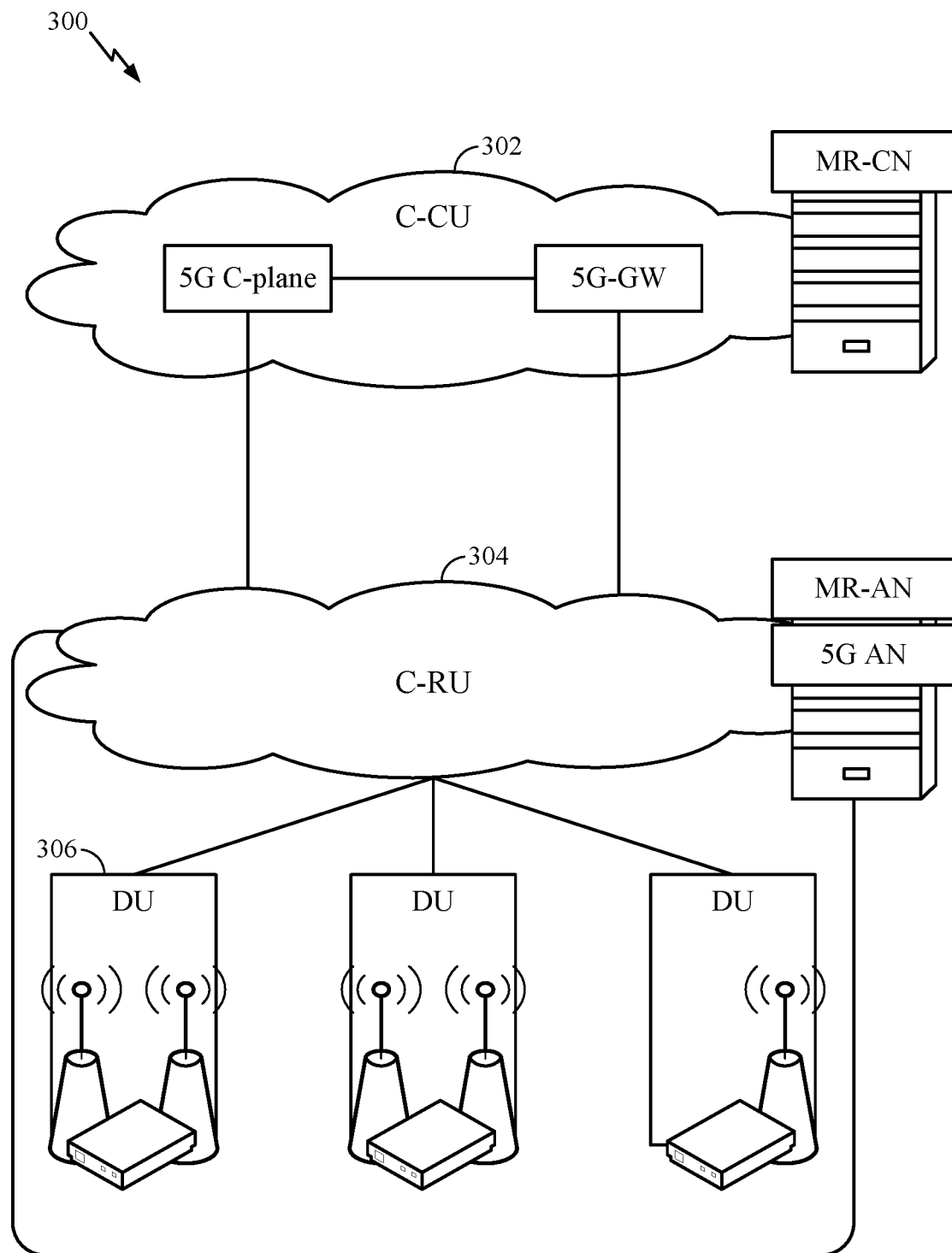
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
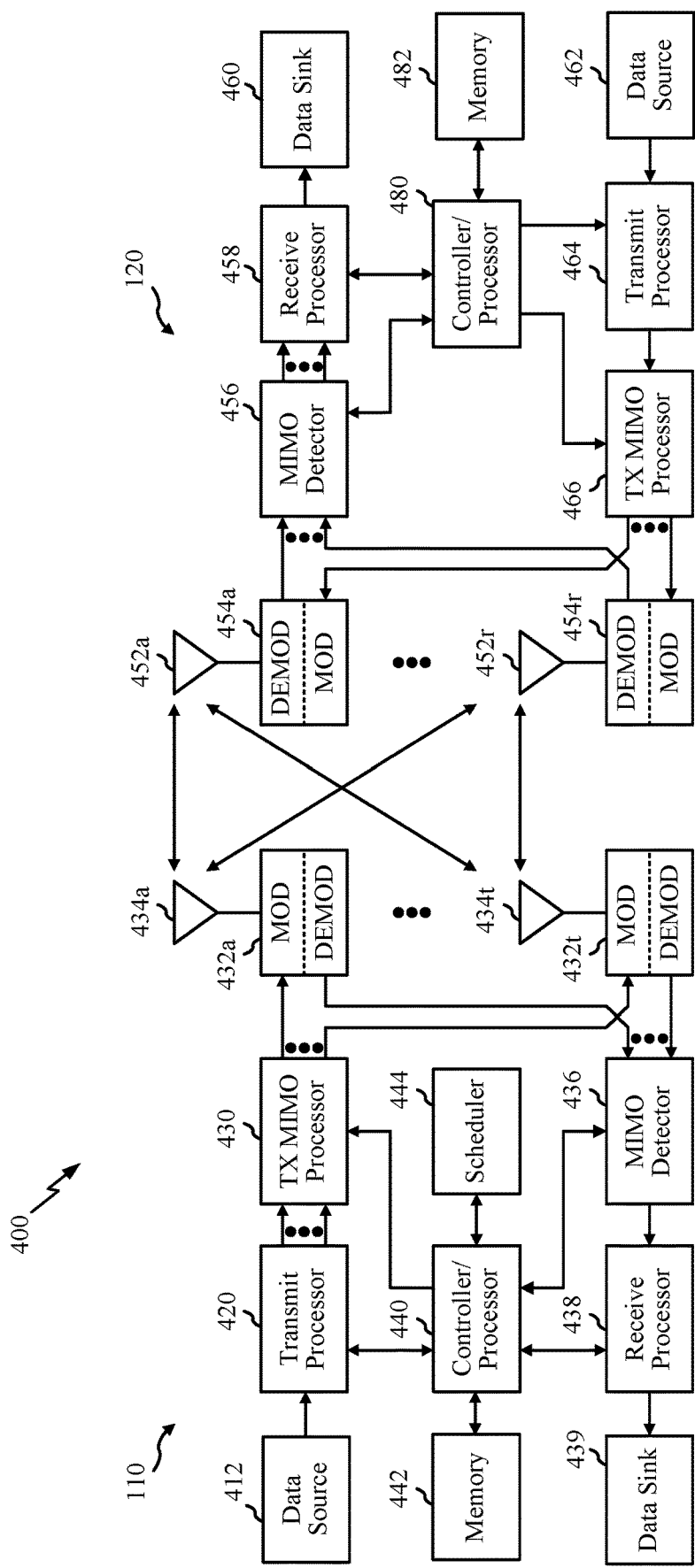
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein. In an aspect, as shown in FIG. 4, each the controller/processor 480 of the UE 120 may be configured to perform secure control plane communication with a network entity (e.g., ANC 202) via the BS according to aspects described herein. In an aspect, as shown in FIG. 4, the controller/processor 440 of the BS 110 may be configured to perform at least a portion of the operations related to the secure control plane communication between the UE 120 an the network entity according to aspects described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
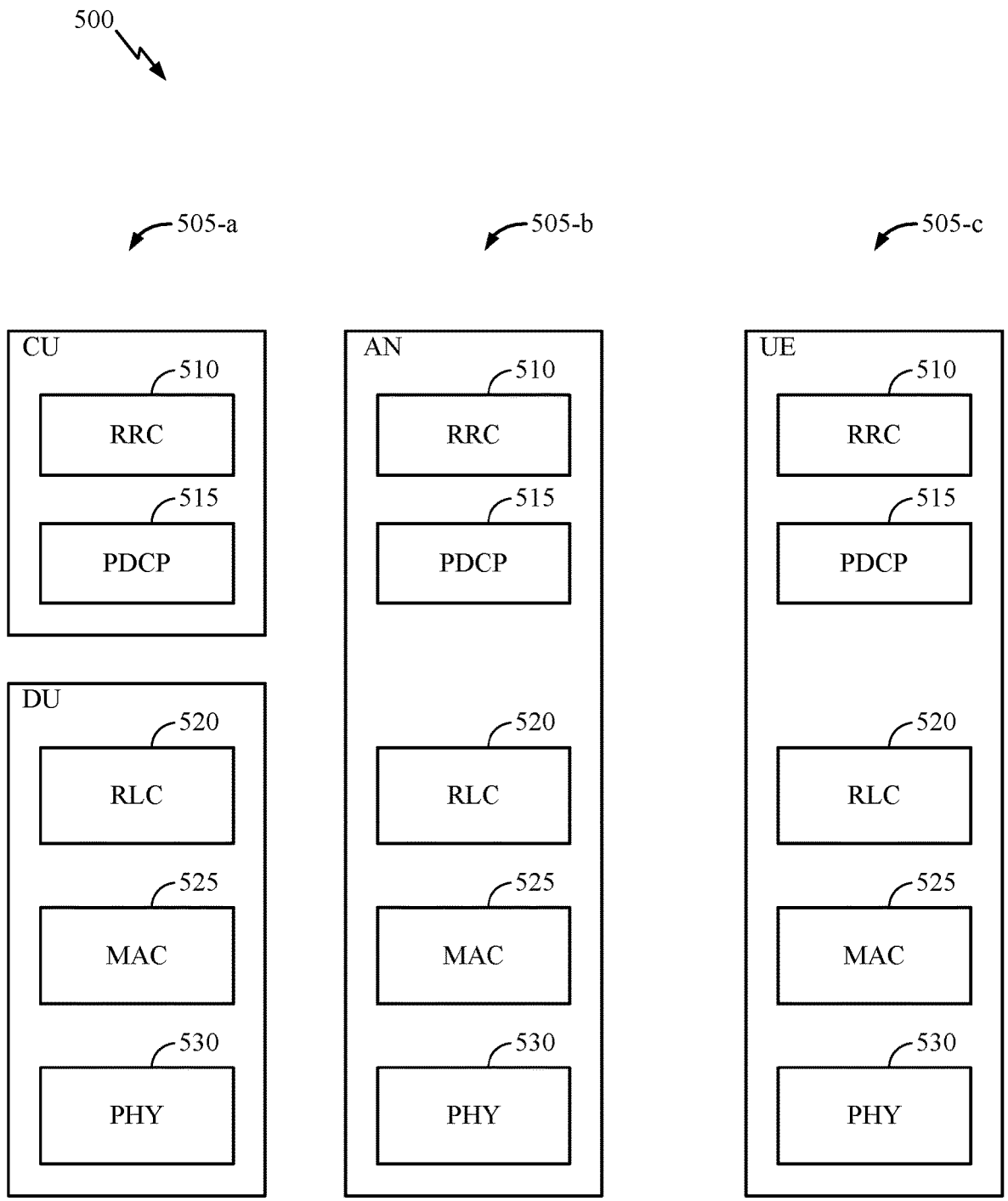
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202/CU in FIG. 2) and distributed network access device (e.g., TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Example Access Stratum Security for a Centralized Ran

Figure 6:
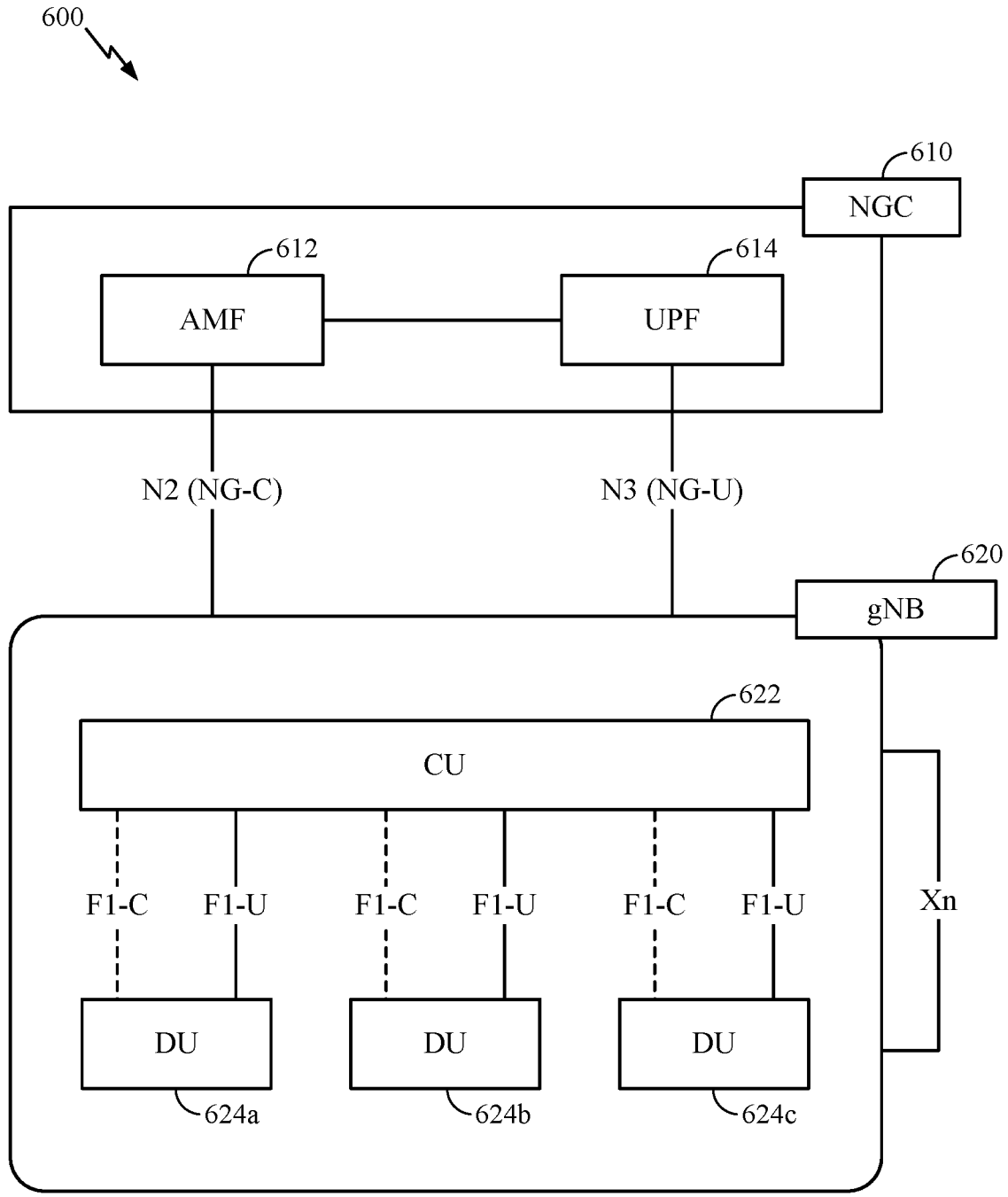
FIG. 6 illustrates an example logical architecture of 5G NR, in accordance with certain aspects of the present disclosure.

In certain aspects, the 5G NR logical architecture is similar to the logical architecture of the distributed RAN 200 illustrated in FIG. 2. FIG. 6 illustrates an example logical architecture 600 of 5G NR, in accordance with certain aspects of the present disclosure. Similar to the distributed RAN architecture 200 of FIG. 2, the 5G NR architecture 600 includes a next generation core (NGC) 610 (similar to the NG-CN 204) and a gNB 620 (similar to the 5G AN 206). The gNB 620 is part of the NR RAN and is responsible to maintain radio communication with one or more UEs. As shown, the NGC 610 includes an access management function (AMF) 612 and a user plane function (UPF) 614. The NGC will not be described in detail as it is outside the scope of the present discussion.

The gNB includes a central unit (CU) 622 and a plurality of Distributed units (DUs) 624 (e.g., 624a, 624b, and 624c) controlled by the CU 622. The F1-C and F1-U are part of a front-haul interface and provide control plane (CP) and user plane (UP) connectivity between the CU and the DUs.

The CU is a logical node that includes the gNB functions like Transfer of user data, Mobility control, Radio access network sharing, Positioning, Session Management etc., except those functions allocated exclusively to the DUs. CU controls the operation of the DUs over the front-haul interface. The DU is a logical node that includes a subset of the gNB functions, depending on the CU-DU functional split option implemented. Its operation is controlled by the CU. The DU is generally an edge unit and is in radio communication with one or more user devices. The DU is also referred to as a base station, or sometimes even gNB when referring to it as a RAN node and in contexts when distinguishing between the different elements of the gNB is not necessary. Generally one DU only connects to one CU. However, one DU connecting to multiple CUs may be supported. Each DU generally supports one or more cells and each cell is supported by only one DU.

In certain aspects, as illustrated in FIG. 5, different functional split options may be implemented in 5G NR, each functional split option splitting the 5G protocol stack differently between the CU and the DU. As illustrated in FIG. 5 a 5G communications protocol stack includes a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. The first option 505-a shows a PDCP-RLC split in which the RRC layer 510 and the PDCP layer 515 are implemented by the central unit, and the RLC layer 520, the MAC layer 525, and the PHY layer 530 are implemented by the DU. In an aspect, the CU-DU split for the gNB is defined in the 5G standards (e.g., 3GPP TS 38.300). It may be noted that while the following disclosure assumes a PDCP-RLC split between the CU and DU, the aspects of this disclosure may equally apply to other protocol stack split options.

In certain aspects, the PDCP layer is responsible for the reordering of the user plane packets and control plane packets based on packet sequence numbers. The PDCP layer is further responsible for the security of the data and control packet transmissions. In certain aspects, the gNB uses security keys to securely communicate user plane and control plane packets between the CU and the DU, as well as between UEs and DUs. In an aspect, during an attach procedure when a UE is attempting to register with the network, the UE needs to establish authentication with the network using at least one security key shared between the UE and the core network (e.g., NGC 610). Once the authentication is successful between the UE and the core network, the core network (e.g., AMF 612) derives a key for the gNB (e.g., gNB specific key, $K_{gNB}$) which the UE attaches to, and provides the $K_{gNB}$ to the gNB. The UE derives the same $K_{gNB}$ based on information received from the gNB. The gNB establishes Access Stratum (AS) security with the UE based on $K_{gNB}$. In an aspect, there are two different sets of keys to secure communication between the UE and the gNB, one set of keys for securing user plane traffic and another set of keys for securing control plane traffic. In an aspect, the control plane keys include a control plane encryption key (e.g., $K_{RRCEnc}$) and a control plane integrity protection key ($K_{RRCInt}$). Similarly, the user plane keys include a user plane encryption key (e.g., $K_{UPEnc}$) and a user plane integrity protection key ($K_{UPInt}$). In an aspect, in accordance with certain 5G standards (e.g., 3GPP TS 33.501), both the control plane and the user plane sets of keys are derived directly from the $K_{gNB}$. In an aspect, the 5G core derives a unique $K_{gNB}$ for each gNB and the user plane keys and the control plane keys are derived from a respective $K_{gNB}$. Thus, if the UE handovers to a different gNB (e.g., inter-gNB handover), the user plane keys and the control plane keys change as well and are based on the $K_{gNB}$ of the target gNB.

As noted above, in accordance with the PDCP-RLC split option, the PDCP is located at the CU, and hence, a DU change (e.g., due to UE handover from a source DU to a target DU) may not require an Access Stratum (AS) key (e.g., $K_{gNB}$) change. In an aspect, the RRC signaling from the gNB indicates whether to derive a new key or not upon DU change. The RRC layer (as shown in FIG. 5) is located above the PDCP layer and is responsible for controlling the behavior of the UE and the gNB. In an aspect the RRC configuration configures the security at the PDCP layer. The gNB signals a UE, via RRC signaling, about a selected security algorithm to be used for communication between the UE and the gNB.

In certain aspects, RAN 3 defines a CU split architecture including CU-control plane (CU-CP) and CU-user plane (CU-UP). In an aspect, the user plane data is handled by the CU-UP entity and the control plane signaling (including RRC signaling) is handled by CU-CP entity. CU-CP is responsible for CP security and CU-UP is responsible for UP security. Both CU-CP and CU-UP have PDCP entities or a portion thereof and security of user plane packets and control plane packets is handled by the respective PDCP entities.

In certain aspects, in a centralized RAN architecture (e.g., cloud based RAN architecture), the CU may be provided as a cloud service and the CU may be located in cloud servers. In this kind of architecture, the DU, deployed as an edge node, is responsible for over the air (OTA) data communication with a UE. The CU-CP and the CU-UP handle the control plane and user plane traffic respectively for the DU and provide packets to the DU for transmission to the UE and receive packets received and forwarded by the DU. In this case, most of the actual processing of the user plane and data packets (e.g., relating to the PDCP and RRC layers) takes place at the CU located in the cloud.

In certain aspects, a problem with the above discussed cloud based architecture where both CU-CP and CU-UP reside in the cloud while DU's are deployed at the edge (i.e., close to UEs) is that RRC signaling latency may be increased over a long F1-C link, which might not be acceptable for certain services and/or applications. For example, a UE receives RRC signaling from a serving base station (e.g., DU) scheduling resources for downlink and uplink transmissions. However, if the CU-CP is located in the cloud, the RRC signaling may experience an increased latency due to the long F1-C link between the CU and the DU. This long RRC signaling latency may not be acceptable for certain latency critical services and/or applications. Further, RRC transport over the F1-C may not be desired due to potential attacks, as the F1-C interface may be exploited by attackers and cause RRC signaling congestion. In an aspect, the user plane communications are generally not too adversely affected because of a long F1-U link, for example, as data packets anyway need to travel through the RAN to the internet.

Certain aspects of the present disclosure discuss techniques for secure low latency control plane communications between a UE and a gNB. In certain aspects, the control plane may be moved toward the RAN edge (e.g., closer to the UE) while keeping the user plane in the cloud. In an aspect, this is accomplished by implementing at least a portion of the CP (e.g., a CP portion responsible for RRC signaling and CP security) in the DU. In certain aspects, moving the CP closer to the UE improves RRC signaling latency and improves CP signaling security by making the CP signaling less vulnerable to attacks.

In certain aspects, when implementing the CP or a portion thereof in the DU, an additional level of CP protection may be implemented to protect RRC messages, by changing the CP keys when the DU changes (e.g., UE handover between DUs). Using different CP keys for different DUs provides security separation between DUs on the CP. This ensures that even if one DU-UE link is compromised (e.g., by compromising a DU), other DU-UE links are still secure. In an aspect, the UP keys may not change upon a DU change as the UP security termination point resides in the cloud (e.g., CU-UP).

In certain aspects, this new configuration for the CP may be made backward compatible. For example, the $K_{gNB}$ is kept at the CU-CP and remains unchanged as long as the gNB does not change. An additional level of intermediate key for the DU (e.g., $K_{DU}$) is derived from the $K_{gNB}$. The DU further derives the CP set of keys $K_{RRCEnc}$ and $K_{RRCInt}$ from the intermediate key $K_{DU}$. In an aspect, the UP set of keys $K_{UPEnc}$ and $K_{UPInt}$ are derived directly from $K_{gNB}$ by CU-CP and provided to and kept at the CU-UP. The UP keys may be kept at the CU-UP as long as the $K_{gNB}$ remains unchanged.

In certain aspects, additional freshness parameters may be defined for the derivation of DU specific key $K_{DU}$. In an aspect, a counter, Nonce, Physical Cell Id (PCI) of the target cell, frequency of the target cell (e.g., Absolute Radio Frequency Channel Number Downlink (ARFCN-DL)) or any combination thereof is used as the freshness parameter for the derivation of $K_{DU}$. In an aspect, the additional freshness parameters are signaled to the UE (e.g., via RRC signaling) on DU change so that the UE can derive the $K_{DU}$ and subsequently $K_{RRCEnc}$ and $K_{RRCInt}$ for use in secure CP communication with the DU. In an aspect, the freshness parameters are derived by the CU-CP and signaled to the UE. Both the gNB and the UE derive the $K_{DU}$ from the $K_{gNB}$ and the same freshness parameter.

Figure 7:
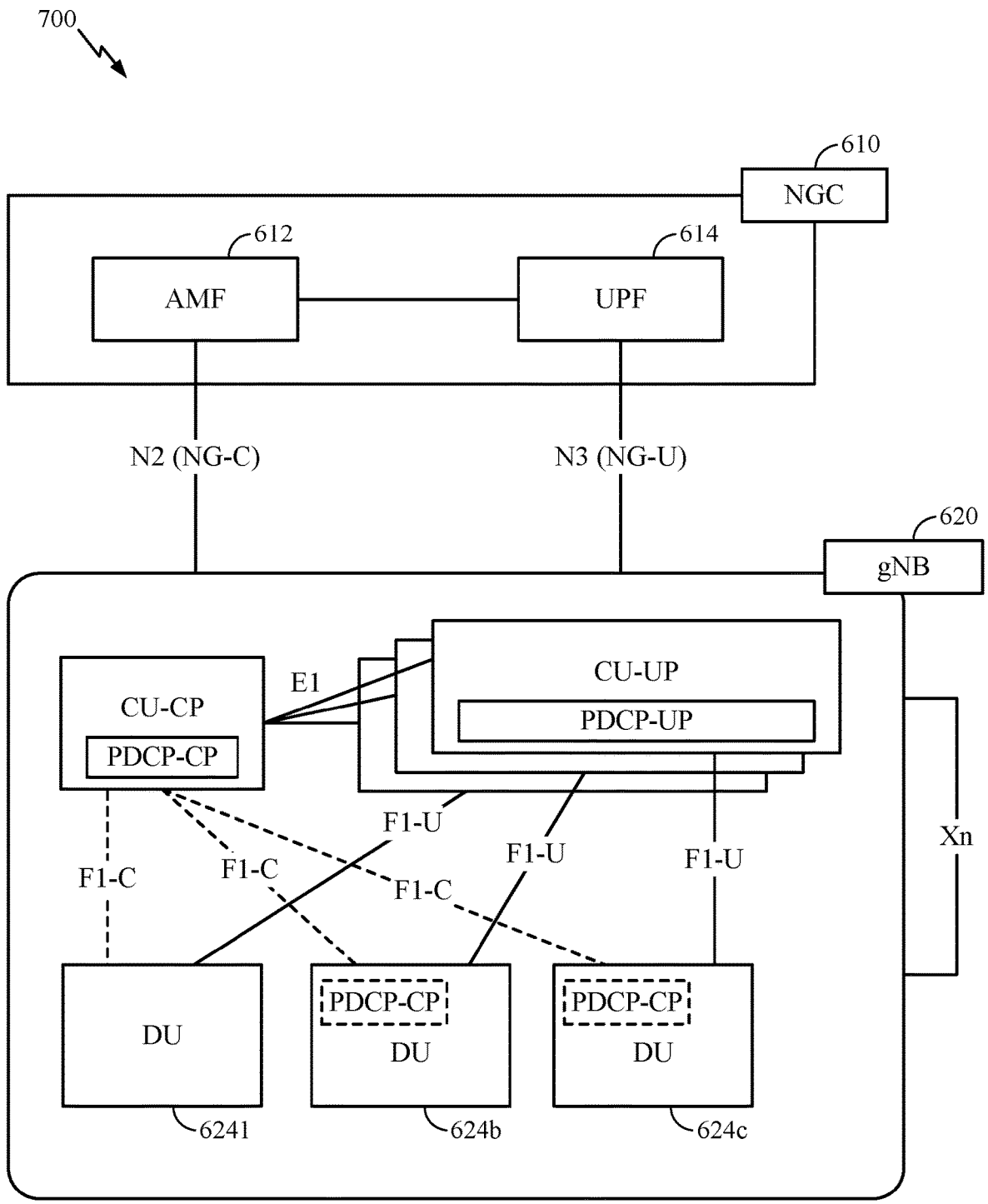
FIG. 7 illustrates a logical architecture of 5G NR with CU split, in accordance with certain aspects of the present disclosure.

FIG. 7 illustrates a logical architecture 700 of 5G NR with CU split, in accordance with certain aspects of the present disclosure. As shown in FIG. 7, the CU is split in to a control plane entity CU-CP and a user plane entity CU-UP. Further, as shown, the PDCP implemented by the CU is also split into a control plane PDCP entity PDCP-CP and a user plane PDCP entity PDCP-UP. The PDCP-CP handles security for CP messages (e.g., RRC signaling) and the PDCP-UP handles security for UP messages. In an aspect, as shown in FIG. 7, the PDCP-CP may reside either in the CU or in the DU. The CU-CP determines the location of the PDCP-CP. In certain aspects, implementing the PDCP-CP in the DU offloads the security processing for the control plane signaling from the CU to the DU. If the PDCP-CP resides in the DU, the DU generates the RRC signaling and itself protects the RRC signaling via the PDCP-CP.

In an aspect, the location of the PDCP-CP is transparent to the UE. The PDCP-CP security keys may be refreshed upon a DU change (e.g., handover of UE between DUs) if the PDCP-CP resides in the DU. For example, upon DU change, the DU specific intermediate key $K_{DU}$ is derived from the current $K_{gNB}$ and sent to the new DU. The $K_{DU}$ change is also indicated to the UE, for example, explicitly (e.g., by providing an increased counter or Nonce) or implicitly (e.g., providing the same counter value as the current one in handover signaling is an explicit indication of no $K_{DU}$ change; or not providing a freshness parameter in handover signaling is an implicit indication of no $K_{DU}$ change). The DU and the UE derive the CP set of keys $K_{RRCEnc}$ and $K_{RRCInt}$ from the intermediate key $K_{DU}$. In an aspect, if the PDCP-CP is located in at the CU-CP, no $K_{DU}$ change is necessary.

It may be noted that, while moving the PDCP-CP to the DU is one realization for CP protection, the CP protection may also be realized by lower protocol layers residing in the DU (e.g., RLC) with the same key derivation applicable.

In certain aspects, the PDCP-UP resides in the CU-UP. The PDCP security keys do not change as long as the $K_{gNB}$ remains unchanged.

Figure 8:
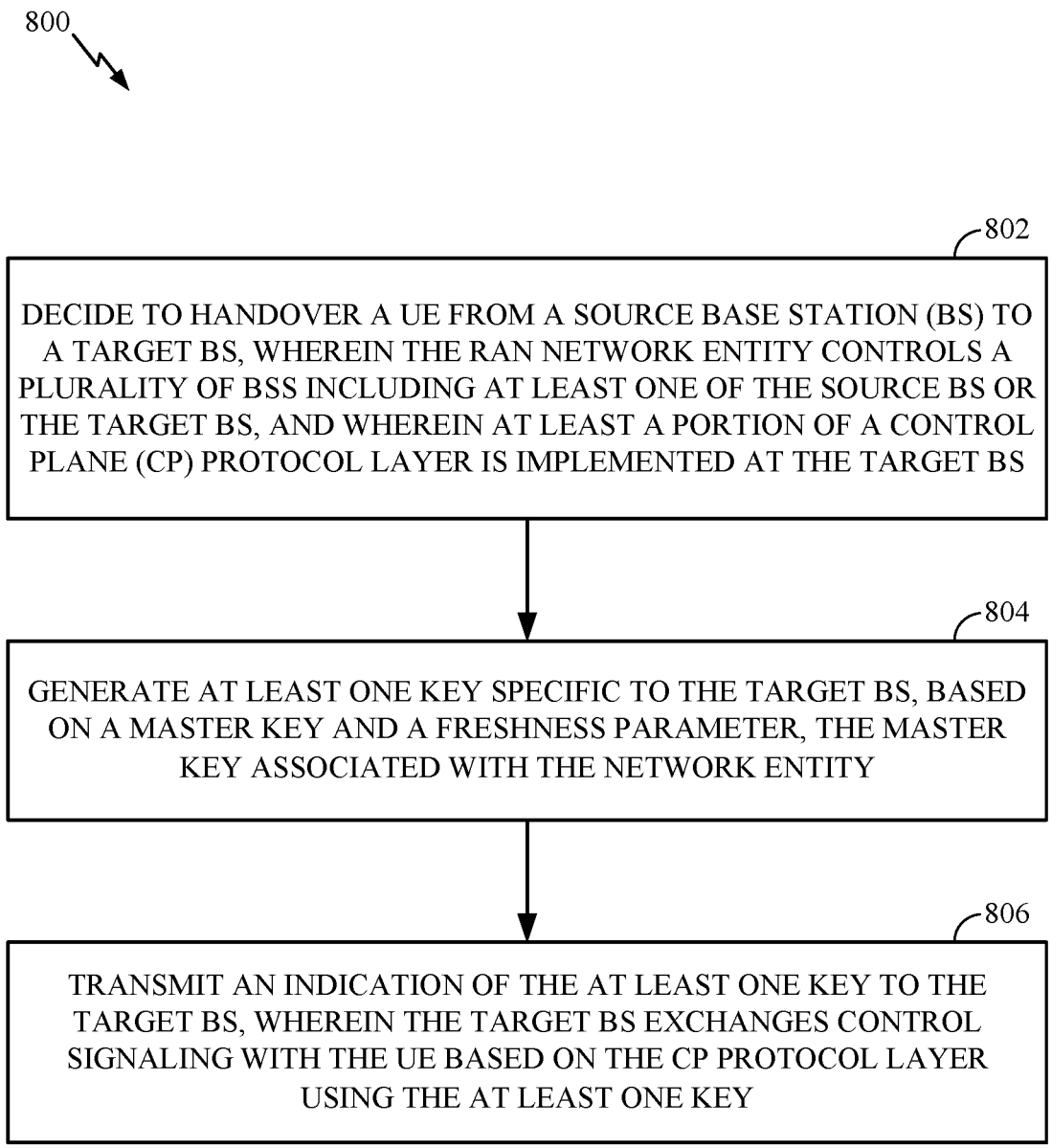
FIG. 8 illustrates example operations performed by a RAN network entity (e.g., CU-CP), for secure CP signaling, in accordance with certain aspects of the present disclosure.

FIG. 8 illustrates example operations 800 performed by a RAN network entity (e.g., CU-CP), for secure CP signaling, in accordance with certain aspects of the present disclosure. Operations 800 begin, at 802 by deciding to handover a UE from a source base station (BS) to a target BS, wherein the RAN network entity controls a plurality of BSs including at least one of the source BS or the target BS, and wherein at least a portion of a CP protocol layer is implemented at the target BS. In an aspect, the source BS is a source DU and the target BS is a target DU. In an aspect, the source and the target BS may be associated to the same gNB or different gNBs. The portion of the CP protocol layer may include PDCP-CP.

At 804, the network entity generates at least one key specific to the target BS, based on a master key and a freshness parameter, wherein the master key is associated with the network entity. For example, the at least one key may include an intermediate key $K_{DU}$ specific to the target DU generated based on a master key (e.g., $K_{gNB}$) and a freshness parameter (e.g., counter or nonce). In an aspect, the at least one key may further include $K_{RRCEnc}$ and $K_{RRCInt}$ which the network entity and/or the target BS may generate from the intermediate key $K_{DU}$.

At 806, the network entity transmits an indication of the at least one key to the target BS, wherein the target BS exchanges control signaling with the UE based on the CP protocol layer, and wherein the control signaling is protected based on the at least one key. For example, the indication may include the $K_{DU}$ and/or $K_{RRCEnc}$ and $K_{RRCInt}$ generated by the network entity.

Figure 9:
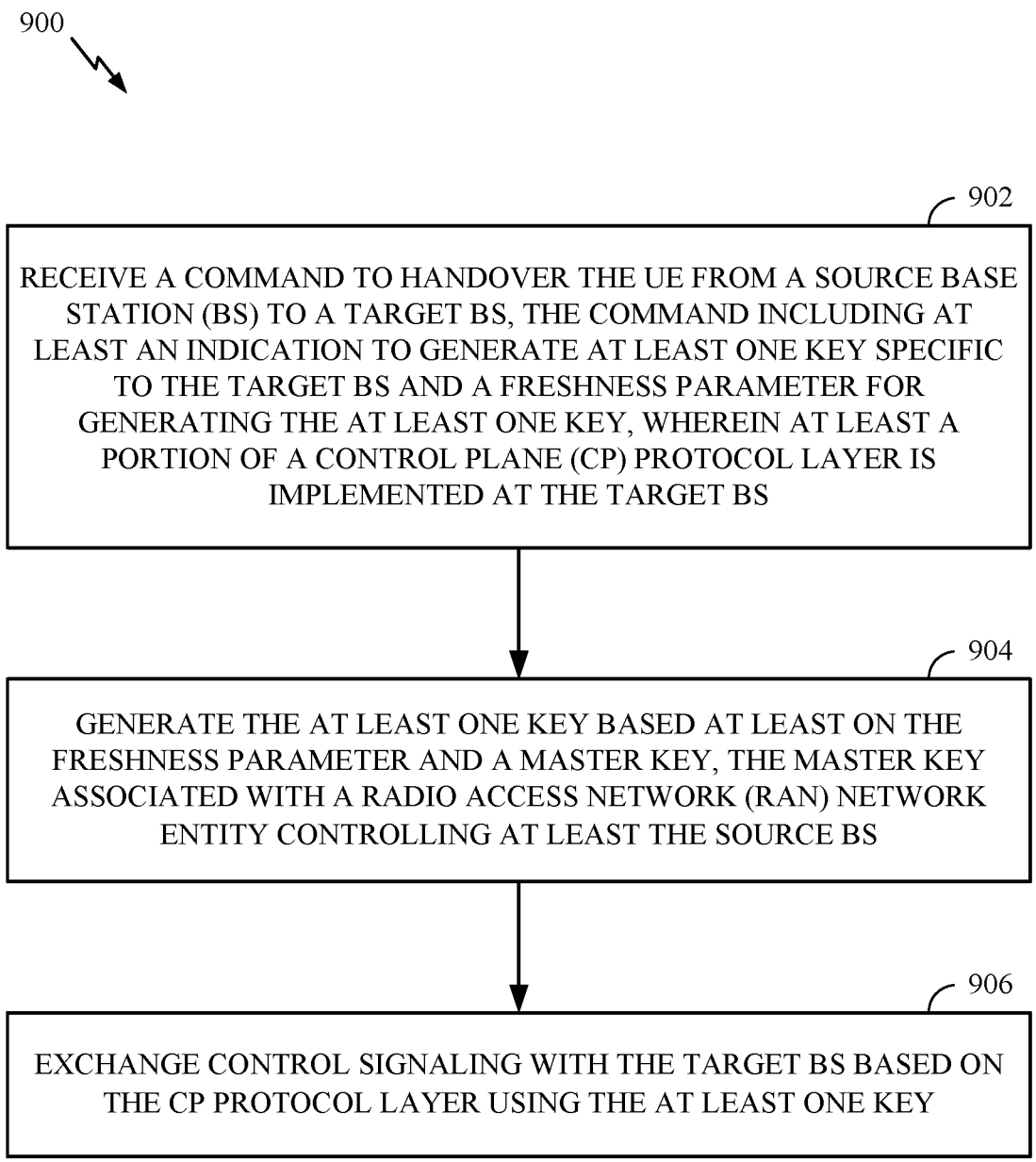
FIG. 9 illustrates example operations performed by a UE, for secure CP communication with the gNB, in accordance with certain aspects of the present disclosure.

FIG. 9 illustrates example operations 900 performed by a UE, for secure CP communication with the gNB, in accordance with certain aspects of the present disclosure.

Operations 900 begin, at 902, by receiving a command to handover the UE from a source base station (BS) to a target BS, the command including at least an indication to generate at least one key specific to the target BS and a freshness parameter for generating the at least one key, wherein at least a portion of a control plane (CP) protocol layer is implemented at the target BS. At 904, the UE generates the at least one key based at least on the freshness parameter and a master key, the master key associated with a Radio Access Network (RAN) network entity controlling at least the source BS. At 906, the UE exchanges control signaling with the target BS based on the CP protocol layer using the at least one key.

In an aspect, the source BS is a source DU and the target BS is a target DU. In an aspect, the source and the target BS may be associated to the same gNB or different gNBs. The portion of the CP protocol layer may include PDCP-CP. The at least one key may include an intermediate key $K_{DU}$ specific to the target DU which the UE generates based on a master key (e.g., $K_{gNB}$) and a freshness parameter (e.g., counter of nonce). In an aspect, the at least one key may further include $K_{RRCEnc}$ and $K_{RRCInt}$ which the UE generates from the intermediate key $K_{DU}$.

In certain aspects, the intermediate key $K_{DU}$ may be derived based on a key derivation function (KDF) as a function of an anchor key ($K_{anchor}$) and freshness parameter. For example, $$K_{DU} = KDF(K_{anchor}, \text{freshness parameter})$$

In one alternative, the $K_{anchor}$ is the $K_{gNB}$ of the current gNB to which the UE is connected to. The freshness parameter may be a counter kept at the CU-CP and the UE (e.g., equivalent to the next hop chaining counter, NCC used for $K_{gNB}$). The freshness parameter may also be nonce(s) generated by the CU-CP, the UE or both. Additionally or alternatively, Absolute Radio Frequency Channel Number (ARFCN) or Physical Cell Identifier (PCI) may also be used as freshness parameter for $K_{DU}$ derivation. Using PCI or ARFCN as freshness parameters allows using the same KDF used for derivation of $K_{gNB}$ for generating $K_{DU}$. This makes the key derivation consistent.

In another alternative, an initial $K_{DU}$ is derived from $K_{gNB}$, i.e., by setting $K_{anchor} = K_{gNB}$ in the KDF. The freshness parameter for the initial $K_{DU}$ generation may be a constant, e.g., a bit string. In an aspect, each subsequent $K_{DU}$ ($K_{DU}'$) is derived based on the KDF by setting the $K_{anchor}$=current $K_{DU}$, for example, in a handover from a source DU to a target DU, the $K_{DU}'$ for the target DU is derived from the $K_{DU}$ of the source DU. However, in this case, since the source DU knows its $K_{DU}$, it may derive the $K_{DU}'$ of the target DU based on the KDF. Thus, forward secrecy is not achievable. In an aspect, to provide forward secrecy, all new $K_{DU}$ are derived by the CU-CP based on the current $K_{DU}'$. For each subsequent DU, the CU-DP derives the $K_{DU}'$ and then derives the $K_{RRCEnc}$ and $K_{RRCInt}$ based on the $K_{DU}'$. Instead of providing the $K_{DU}'$ to each new DU, the CU-CP provides the $K_{RRCEnc}$ and $K_{RRCInt}$ to each new DU to maintain forward secrecy. This way none of the DUs are aware of their $K_{DU}$ and may not derive a subsequent $K_{DU}'$.

Figure 10:
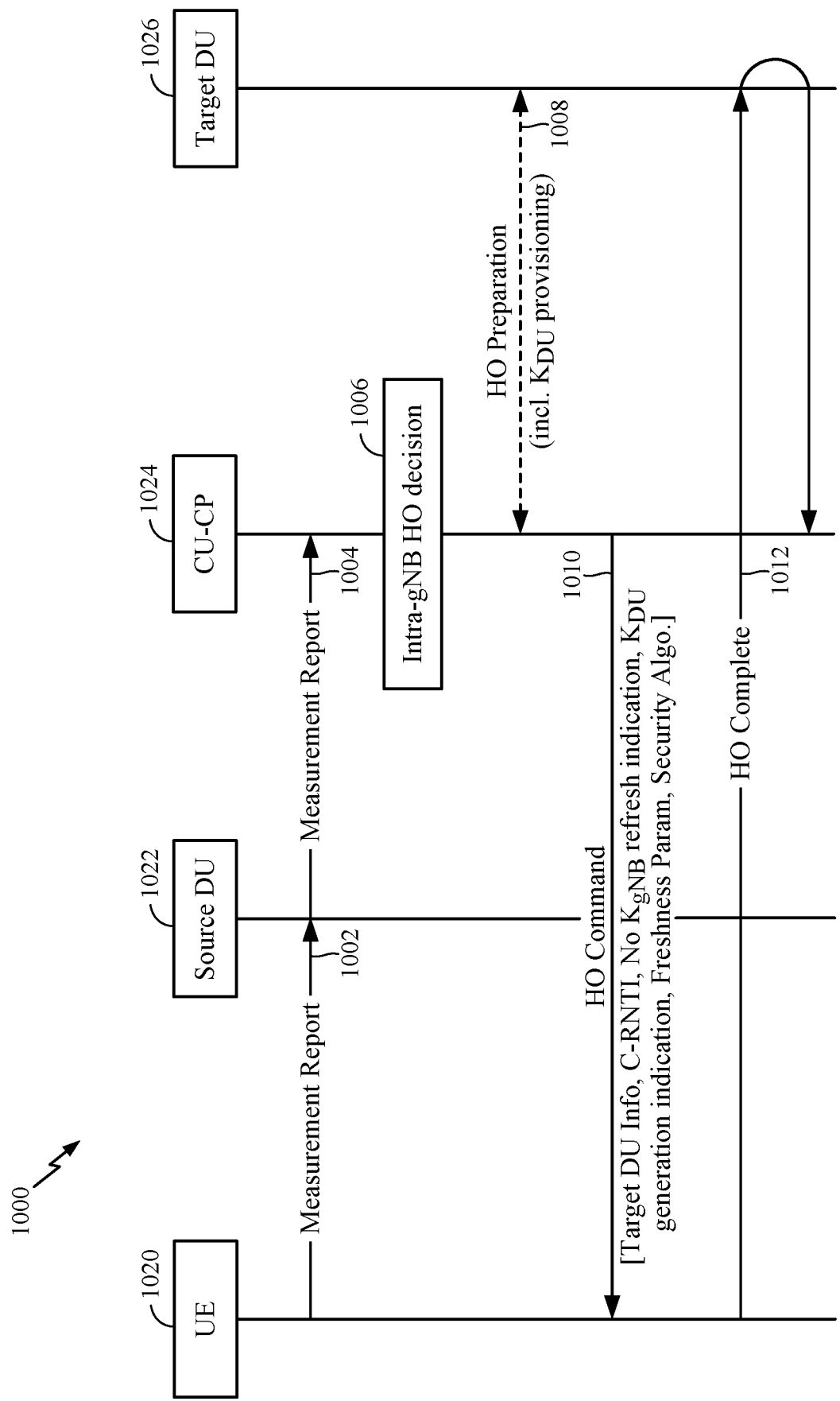
FIG. 10 illustrates an example call flow for generating security keys during an Intra-CU/gNB handover, in accordance with certain aspects of the present disclosure.

FIG. 10 illustrates an example call flow 1000 for generating security keys during an Intra-CU/gNB handover, in accordance with certain aspects of the present disclosure. Call flow 1000 shows a handover of UE 1020 from a source DU 1022 to a target DU 1026. Both the source and the target DUs are part of the same gNB and are controlled by the same CU-CP 1024.

As shown, at 1002, the UE 1020 provides measurement reports to the source DU 1022, which is the UEs current serving base station. At 1004, the source DU 1022 forwards the measurement reports received from the UE 1020 to the CU-CP 1024. In an aspect, the measurement reports include receive signal strengths (e.g., SNR) of DUs in the vicinity of the UE including the target DU 1026. At 1006, the CU-CP 1024, based on the measurement reports, decides to perform an intra-gNB handover of the UE 1020 from the source DU 1022 to the target DU 1026. At 1008, the CU-CP 1024 configures the target DU 1026 in preparation of the handover. In an aspect, the CU-CP 1024 may derive a $K_{DU}$ specific to the target DU 1026 based on the $K_{gNB}$. The configuration information communicated to the target DU 1026 at 1008 may include communicating the $K_{DU}$ to the target DU 1026. In an aspect, the CU-CP 1024 may derive $K_{RRCEnc}$ and $K_{RRCInt}$ based on the $K_{DU}$ of the target DU 1026 and the configuration information communicated to the target DU 1026 at 1008 may include the $K_{RRCEnc}$ and $K_{RRCInt}$ keys. In an aspect, the CU-CP may configure the target DU 1026 with the $K_{RRCEnc}$ and $K_{RRCInt}$ keys instead of $K_{DU}$ to maintain forward secrecy in the case when each new $K_{DU}'$ is being derived from a current $K_{DU}$, as discussed above.

At 1010, the CU-CP 1024 instructs the source DU 1022 to send a handover command to the UE 1020. In an aspect, the handover command includes target DU information (e.g., an ID of the target DU 1026), C-RNTI, an indication that $K_{gNB}$ is not to be refreshed (e.g., as this is an inter-gNB handover), an indication that $K_{DU}$ is to be generated (e.g., for the target DU 1026), freshness parameter for generation of $K_{DU}$, and security algorithm to be used for communication with the target DU 1026. The source DU 1022 transmits the handover command to the UE, for example, via RRC-Connection Reconfiguration message. In an aspect, the CU-CP 1024 provides the source DU 1022 with at least some of the information to be included in the handover command. For example, the CU-CP 1024 provides the indication that $K_{DU}$ is to be generated (e.g., for the target DU 1026) and the freshness parameter to the source DU 1022. The source DU then includes the received information in an RRC message. In an aspect, the CU-CP 1024 generates an RRC message including the information of the handover message and transmits the RRC message to the source DU 1012. The source DU 1012 then forwards the RRC message to the UE. In an aspect, in response to the handover command, the UE derives the $K_{DU}$ for the target DU 1026 based on the $K_{gNB}$ (which the UE derived during an attach procedure with the gNB) and the freshness parameter communicated by the CU-CP 1024 via the source DU 1022. The UE further derives the CP keys $K_{RRCEnc}$ and $K_{RRCInt}$ based on the derived $K_{DU}$ for use in CP communication with the target DU 1026.

At 1012, the UE transmits a handover complete message to the target DU 1026, for example, via RRCConnectionReconfigurationComplete message which is protected by at least one of the $K_{RRCEnc}$ and $K_{RRCInt}$ keys.

Figure 11:
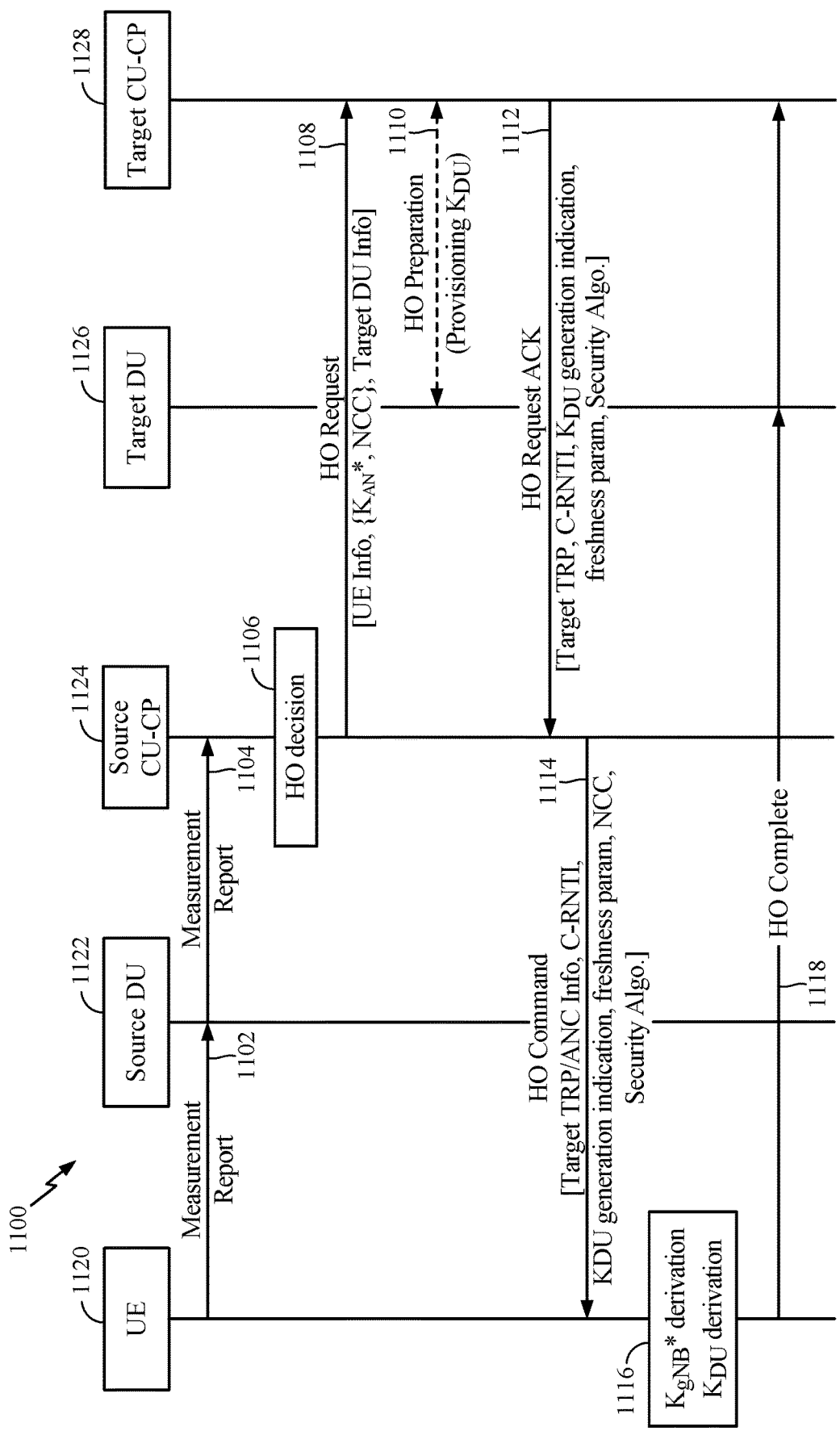
FIG. 11 illustrates an example call flow for generating security keys during an Xn based Inter-gNB handover, in accordance with certain aspects of the present disclosure.

FIG. 11 illustrates an example call flow 1100 for generating security keys during an Xn based Inter-gNB handover, in accordance with certain aspects of the present disclosure. Call flow 1100 shows a handover of UE 1120 from a source DU 1122 associated with a source CU-CP 1124 to a target DU 1126 associated with a target CU-CP 1128. The source DU 1122 and the source CU-CP 1124 belong to a source gNB (not shown) and the target DU 1126 and the target CU-CP 1128 belong to a different target gNB (also not shown). The source DU 1122 is controlled by CU-CP 1124 of the source gNB and the target DU 1126 is controlled by the target CU-CP 1128 of the target gNB. The source gNB and the target gNB have a direct Xn interface.

At 1102 the UE transmits measurement reports to the source DU 1122, the measurement reports including measurements (e.g., received SNR) for one or more neighboring DUs including the target DU 1126. At 1104, the source DU 1122 forwards the measurement report to the source CU-CP 1124. At 1106, the source CU-CP 1124, based on the measurement report, decides to perform an inter-gNB handover (HO) of the UE 1120 from the source DU 1122 to target DU 1126. The source CU-CP 1124 derives a $K_{gNB}^*$ for the target gNB, based on the current $K_{gNB}$ of the source gNB. At 1108, the source CU-CP 1124 sends a handover request to the target CU-CP 1128 (e.g., via the Xn interface), the handover request including the $K_{gNB}^*$, Next Hop Chaining Counter (NCC) information, and target DU information. The target CU-CP 1128 may use the $K_{gNB}^*$ and the NCC information for deriving subsequent keys including $K_{DU}$ of the target DU 1126 and other CP keys. The target CU-CP 1128 derives the $K_{DU}$ for the target DU 1126 based on the $K_{gNB}^*$ and a freshness parameter and provisions the $K_{DU}$, at 1110, to the target DU 1126. In an aspect, the target CU-CP 1128 derives the CP keys $K_{RRCEnc}$ and $K_{RRCInt}$ based on the generated $K_{DU}$ and provides the CP keys to the target DU 1126.

At 1112, the target CU-CP 1128 sends a handover request acknowledgement to the source CU-CP 1124 (e.g., via the Xn interface), the acknowledgement including an indication for the UE to generate the $K_{DU}$ of the target DU 1126 and freshness parameter for generating the $K_{DU}$. The acknowledgement may further include target DU/TRP information, C-RNTI, and security algorithm. At 1114, the source CU-CP 1124 directs the source DU 1122 to send a handover command to the UE 1120 including an indication to generate the $K_{DU}$ and the freshness parameter received from the target CU-CP 1128. Other information included in the handover command (e.g., NCC, target TRP/ANC information) is same as those for Xn based handover as defined in 5G specifications. In an aspect, the source DU 1122 sends the handover command to the UE 1120 via the RRCConnectionReconfigutation message. At 1116, the UE derives the $K_{gNB}^*$ for the target gNB based on the current $K_{gNB}$ of the source gNB and NCC information. The derivation of the $K_{gNB}^*$ by the UE is defined in the 5G standards. The UE further derives the $K_{DU}$ for the target DU 1126 based on the $K_{gNB}^*$ and the received freshness parameter. In an aspect, the UE further generates the CP keys $K_{RRCEnc}$ and $K_{RRCInt}$ for protecting CP communication between the UE 1120 and the target DU 1126. At 1118, the UE transmits a handover complete message to the target DU 1126 (e.g., via RRCConnectionReconfigutationComplete message) which is forwarded to the target CU-CP 1128.

Figure 12:
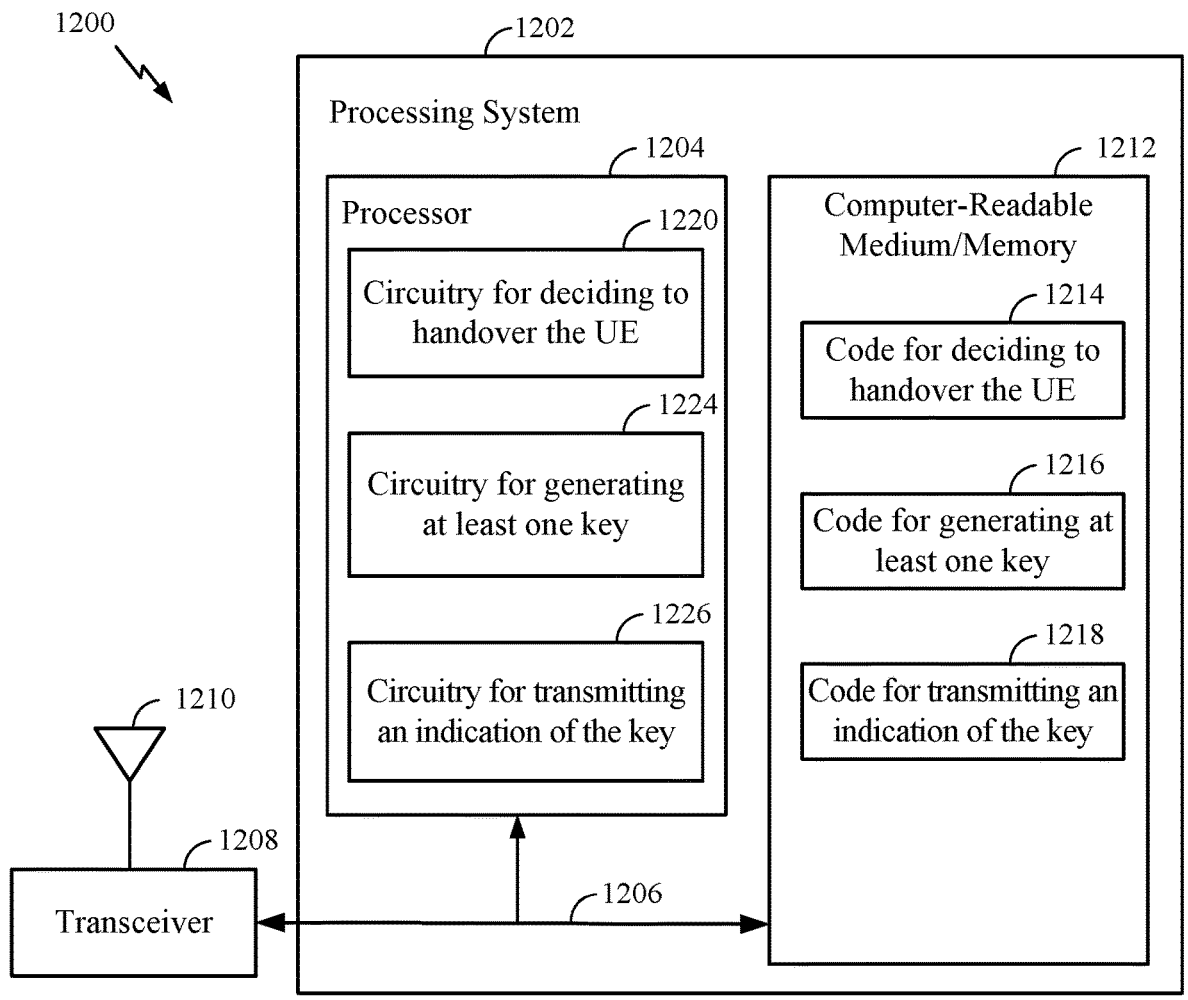
FIG. 12 illustrates a communications device that may include various components (e.g., corresponding to means-plus-function components) configured to perform operations for the techniques disclosed herein, such as the operations illustrated in FIG. 8.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 8, or other operations for performing the various techniques discussed herein for secure control plane communication. In certain aspects, computer-readable medium/memory 1212 stores code for deciding to handover a UE from a source BS to a target BS 1214, code for generating at least one key specific to the target BS 1216, and code for transmitting an indication of the at least one key to the target BS 1218. In certain aspects, the processor 1204 has circuitry configured to implement the code stored in the computer-readable medium/memory 1212. The processor 1204 includes circuitry for deciding to handover a UE from a source BS to a target BS 1220, circuitry for generating at least one key specific to the target BS 1224, and circuitry for transmitting an indication of the at least one key to the target BS 1226.

Figure 13:
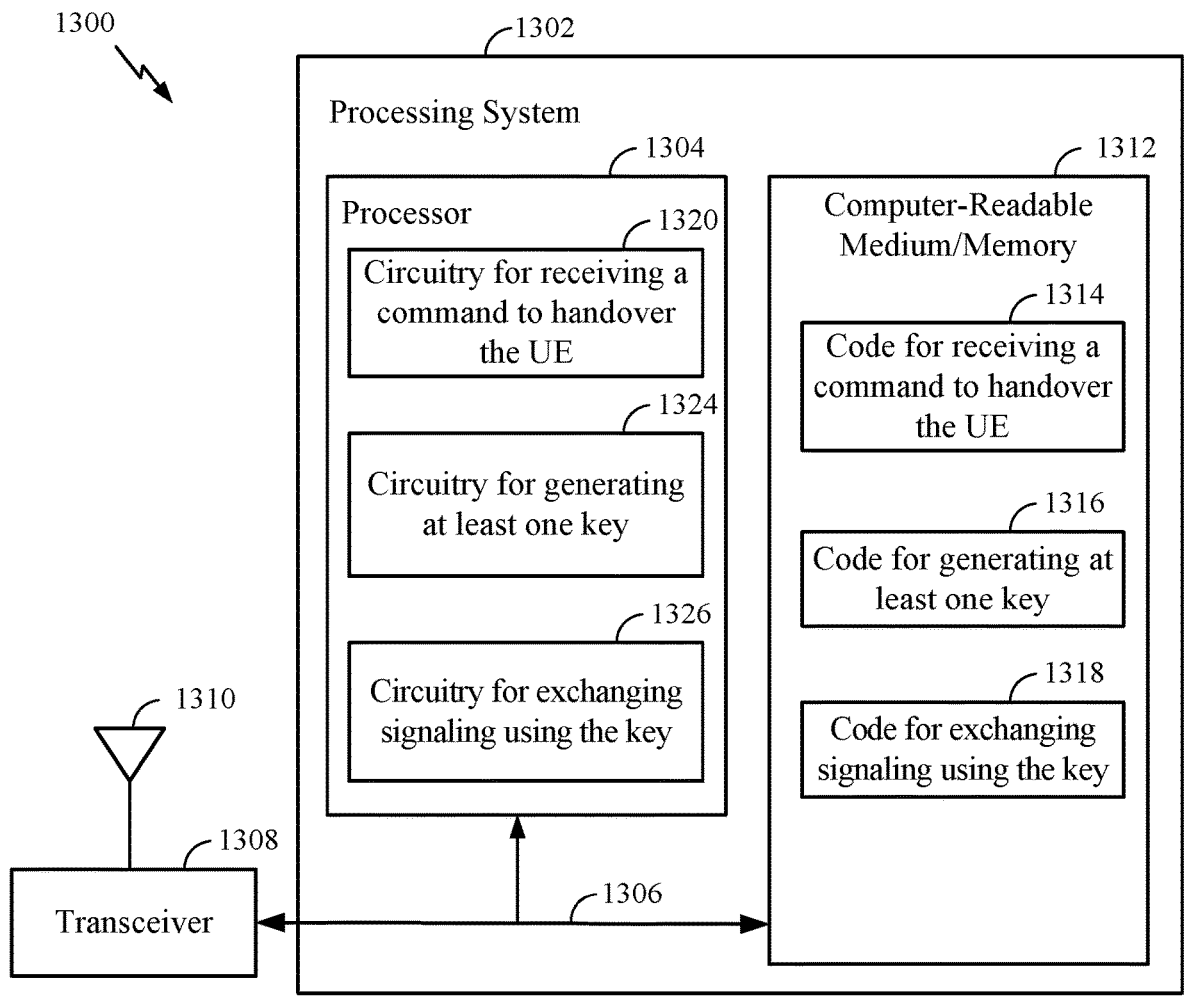
FIG. 13 illustrates a communications device that may include various components (e.g., corresponding to means-plus-function components) configured to perform operations for the techniques disclosed herein, such as the operations illustrated in FIG. 9.

FIG. 13 illustrates a communications device 1300 that may include various components (e.g., corresponding to means-plus-function components) configured to perform operations for the techniques disclosed herein, such as the operations illustrated in FIG. 9. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein for secure control plane communication. In certain aspects, computer-readable medium/memory 1312 stores code for receiving a command to handover the UE from a source BS to a target BS 1314, code for generating at least one key 1316, and code for exchanging signaling with the target BS based on the CP protocol layer using the at least one key 1318. In certain aspects, the processor 1304 has circuitry configured to implement the code stored in the computer-readable medium/memory 1312. The processor 1304 includes circuitry for receiving a command to handover the UE from a source BS to a target BS 1320, circuitry for generating at least one key 1324, and circuitry for exchanging signaling with the target BS based on the CP protocol layer using the at least one key 1326.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
   receiving a handover command to handover the UE from a source distributed unit (DU) to a target DU, wherein the handover command includes an indication to generate at least one control plane (CP) key specific to the target DU and a freshness parameter for generating the at least one CP key, wherein the source DU and target DU are associated with a centralized unit (CU);
   performing a handover from the source DU to the target DU based on the command;
   generating the CP key based on the indication in the handover command, the freshness parameter, and an access stratum (AS) key associated with the CU, wherein: the AS key is not changed in connection with the handover of the UE from the source DU to the target DU;
   exchanging control signaling with the target DU using the at least one CP key.

2. The method of claim 1, wherein generating the at least one CP key includes generating an intermediate key specific to the target DU, based on the AS key and the freshness parameter.

3. The method of claim 2, wherein generating the at least one CP key further includes generating an RRC encryption key ($K_{RRCenc}$) and a RRC integrity protection key ($K_{RRCint}$) based on the intermediate key.

4. The method of claim 2, further comprising:
   receiving a subsequent handover command to handover the UE from the target DU to a subsequent target DU, the subsequent handover command including an indication to generate at least one subsequent CP key specific to the subsequent target DU and a subsequent freshness parameter;
   and exchanging signaling with the subsequent target DU based on the at least one subsequent CP key.

5. The method of claim 4, wherein generating the least one subsequent CP key includes:
   generating a subsequent intermediate key for the handover of the UE to the subsequent target DU, based on the intermediate key and the subsequent freshness parameter;
   and generating an RRC encryption key ($K_{RRCenc}$) and a RRC integrity protection key ($K_{RRCint}$) based on the subsequent intermediate key.

6. The method of claim 1, wherein control signaling includes RRC signaling.

7. The method of claim 1, wherein the command to handover includes an indication to generate the AS key, wherein the indication includes a freshness parameter to generate the AS key.

8. The method of claim 1, wherein:
   at least a portion of a CP protocol layer is implemented at the target DU and the source DU,
   the at least the portion of the CP protocol layer implemented at the target DU and the source DU comprises a portion responsible for radio resource control (RRC) signaling,
   and user plane protocol layers are implemented at the CU controlling at least the source DU,
   and the CU is separate from the at least the source DU and is separate from a core network.

9. The method of claim 8, wherein the CP protocol layer includes Central Unit (CU)-CP (CU-CP) according to a fifth generation (5G) radio access network (RAN) architecture.

10. The method of claim 9, wherein the portion of the CP protocol layer includes Packet Data Convergence Protocol (PDCP)-CP (PDCP-CP) according to the 5G NR RAN architecture.

11. A method for wireless communication by a Radio Access Network (RAN) network entity, comprising:
    deciding to handover a UE from a source distributed unit (DU) to a target DU, wherein:

the RAN network entity controls a plurality of DUs including at least one of the source DU or the target DU, and the RAN network entity is a centralized unit (CU) associated with the source DU and the target DU;

generating at least one control plane (CP) key specific to the target DU, based on an access stratum (AS) key and a freshness parameter, wherein the AS key is associated with the CU;

transmitting an indication of the at least one CP key to the target DU;

and directing the source DU to transmit a handover command to the UE to handover the UE from the source DU to the target DU, wherein: the handover command includes the freshness parameter for generating the at least one CP key and an indication for the UE to generate the at least one CP key and the AS key is not changed in connection with the handover of the UE from the source DU to the target DU.

12. The method of claim 11, further comprising generating an RRC message including the command, wherein directing the source DU to transmit the command includes directing the source DU to forward the RRC message to the UE.

13. The method of claim 11, further comprising transmitting the indication to generate and the freshness parameter to the source DU for forwarding to the UE via an RRC message.

14. The method of claim 11, wherein generating the at least one CP key includes:
generating, based on the AS key and the freshness parameter, an intermediate key specific to the target DU.

15. The method of claim 14, wherein the indication includes an indication of the intermediate key.

16. The method of claim 14, further comprising:
generating, based on the intermediate key and a subsequent freshness parameter, a subsequent intermediate key for the handover of the UE to a subsequent target DU.

17. The method of claim 16, wherein generating the at least one CP key includes:
generating an RRC encryption key ($K_{RRCenc}$) and a RRC integrity protection key ($K_{RRCint}$) based on the subsequent intermediate key.

18. The method of claim 17, wherein the indication includes an indication of the RRC encryption key ($K_{RRCenc}$) and the RRC integrity protection key ($K_{RRCint}$).

19. The method of claim 11, wherein control signaling includes RRC signaling.

20. The method of claim 11, wherein the freshness parameter includes at least one of a counter, a nonce, Physical Cell Identifier (PCI), or Absolute Radio Frequency Channel Number (ARFCN).

21. The method of claim 11, wherein:
at least a portion of a control plane (CP) protocol layer is implemented at the target DU and the source DU,
the at least the portion of the CP protocol layer implemented at the target DU and the source DU comprises a portion responsible for radio resource control (RRC) signaling,
user plane protocol layers are implemented at the CU,
and the CU is separate-from at least the source DU and is separate from a core network.

22. The method of claim 21, wherein the CP protocol layer includes a Control Unit (CU)-CP (CU-CP) according to a fifth generation (5G) radio access network (RAN) architecture.

23. The method of claim 22, wherein the portion of the CP protocol layer includes Packet Data Convergence Protocol (PDCP)-CP (PDCP-CP) according to the 5G NR RAN architecture.

24. The method of claim 21, wherein:
the target DU exchanges control signaling with the UE based on the CP protocol layer,
and the control signaling is protected based on the at least one CP key.

25. A processing system for wireless communications by a user equipment (UE), comprising:
one or more processors individually or collectively configured to execute instructions stored on one or more memories and to cause the UE to:
receive a handover command to handover the UE from a source distributed unit (DU) to a target DU, wherein the command includes an indication to generate at least one control plane (CP) key specific to the target DU and a freshness parameter for generating the at least one CP key, wherein the source DU and target DU are associated with a centralized unit (CU);
perform a handover from the source DU to the target DU based on the command;
generate the CP key based on the indication in the handover command, the freshness parameter, and an access stratum (AS) key associated with the CU, wherein: the AS key is not changed in connection with the handover of the UE from the source DU to the target DU;
exchange control signaling with the target DU using the at least one CP key.

26. The processing system of claim 25, wherein the one or more processors are further configured to cause the UE to generate, based on the AS key and the freshness parameter, an intermediate key specific to the target DU.

27. The processing system of claim 25, wherein the one or more processors are further configured to cause the UE to:
receive a subsequent command to handover the UE from the target DU to a subsequent target DU, wherein the subsequent command includes an indication to generate at least one subsequent CP key specific to the subsequent target DU and a subsequent freshness parameter;
and exchange signaling with the subsequent target DU based on the at least one subsequent CP key.

28. A processing system for wireless communication by a Radio Access Network (RAN) network entity, comprising:
one or more processors individually or collectively configured to execute instructions stored on one or more memories and to cause the RAN network entity to:
decide to handover a UE from a source distributed unit (DU) to a target DU, wherein:
the RAN network entity controls a plurality of DUs including at least one of the source DU or the target DU,
and the RAN network entity is a centralized unit (CU) associated with the source DU and the target DU;
generate at least one CP key specific to the target DU, based on an access stratum (AS) key and a freshness parameter, wherein the AS key is associated with the CU;
transmit an indication of the at least one CP key to the target DU;
and direct the source DU to transmit a handover command to the UE to handover the UE from the source DU to the target DU, wherein:

the handover command includes the freshness parameter for generating the at least one CP key and an indication for the UE to generate the at least one CP key, and the AS key is not changed in connection with the handover of the UE from the source DU to the target DU.

29. The processing system of claim 28, wherein the one or more processors are further configured to cause the RAN network entity to:

generate, based on the AS key and the freshness parameter, an intermediate key specific to the target DU.

30. The processing system of claim 29, wherein the one or more processors are further configured to cause the RAN network entity to:

generate, based on the intermediate key and a subsequent freshness parameter, a subsequent intermediate key for handover of the UE to a subsequent target DU.

* * * * *